Figure 1:
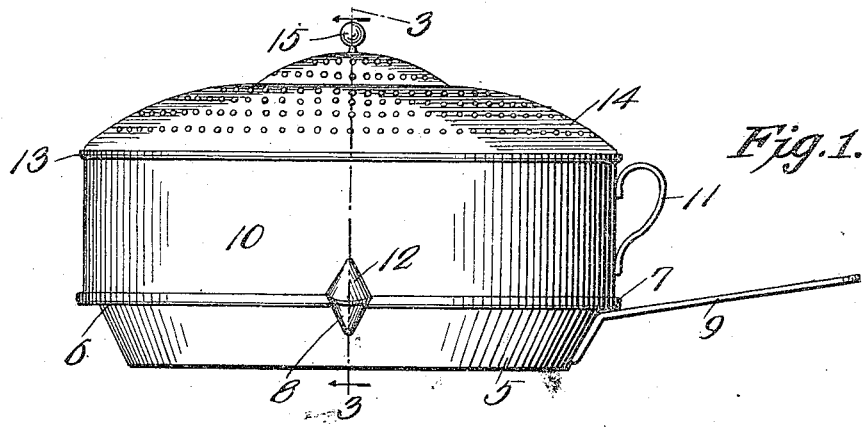

A. P. WILLIAMS.
FRYING PAN.
APPLICATION FILED APR. 12, 1916.

1,267,029. Patented May 21, 1918.

Witnesses
James F. Crown,
J. K. Galt.

Inventor
A. P. Williams,
By Chandler Chandler
Attorneys

UNITED STATES PATENT OFFICE.

ANNA P. WILLIAMS, OF SCRANTON, PENNSYLVANIA.

FRYING-PAN.

1,267,029.  Specification of Letters Patent.  Patented May 21, 1918.

Application filed April 12, 1916. Serial No. 90,722.

*To all whom it may concern:*

Be it known that I, ANNA P. WILLIAMS, a citizen of the United States, residing at Scranton, in the county of Lackawanna, State of Pennsylvania, have invented certain new and useful Improvements in Frying-Pans; and I do hereby declare the following to be a full, clear, and exact description of the invention, such as will enable others skilled in the art to which it appertains to make and use the same.

This invention relates to cooking utensils, and has for its primary object to provide a simple and improved means for preventing grease within the utensil from splashing or sputtering out of the utensil upon the hands of the operator, upon the stove, or upon the floor during the cooking operation.

A further object of the invention is to provide improved means for use in connection with a frying pan or skillet for enabling the same to be used as a baking or roasting vessel.

A still further object of the invention is to provide in a removable extension wall for a cooking utensil improved means for retaining the wall upon the utensil to prevent the same from becoming accidentally detached therefrom.

A still further object of the invention is to provide a device of this character which is of simple and inexpensive construction, which is capable of ready application to a pan, which may be readily detached from the pan when not needed, which is so formed or constructed as to permit of the same being readily and quickly cleaned, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings, and particularly pointed out in the claim.

Figure 2:
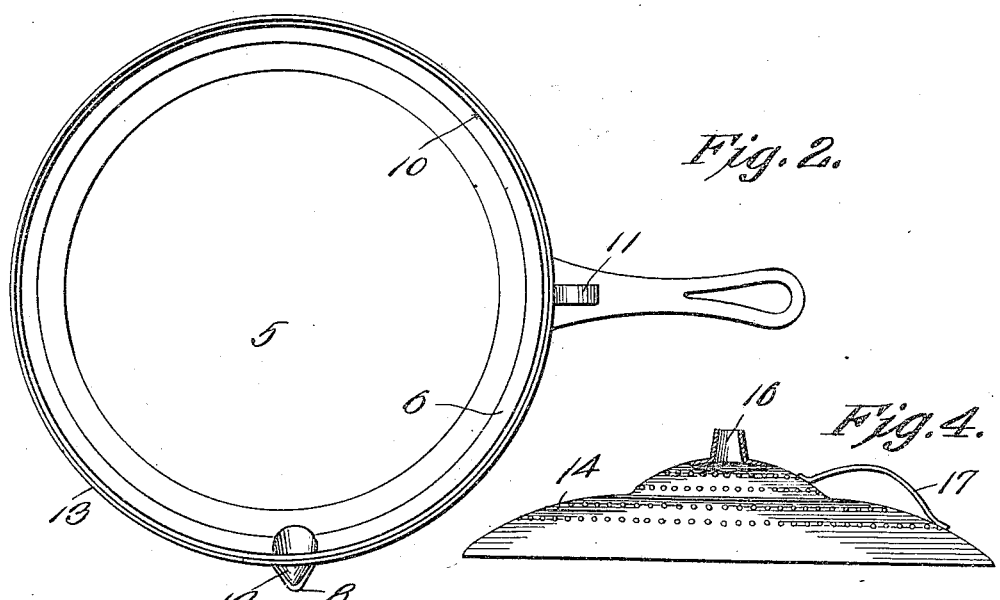
Figure 4:
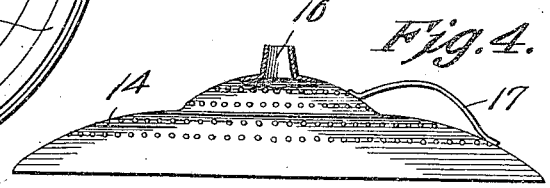
Figure 3:
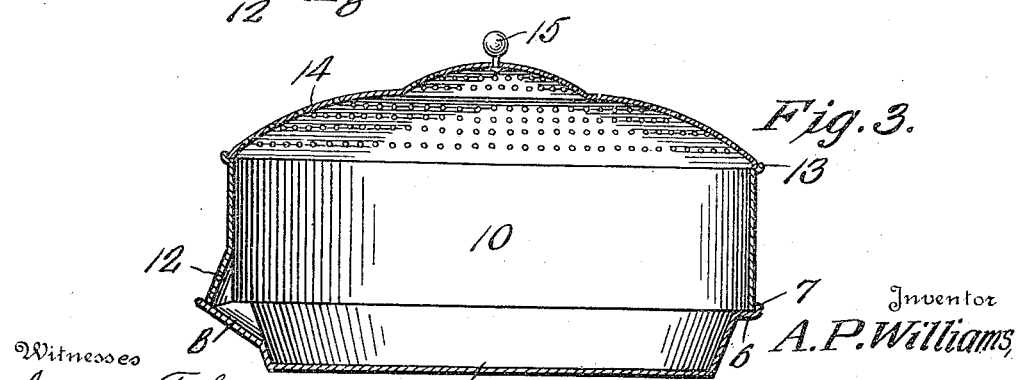

The invention will be best understood by reference to the accompanying drawings, wherein:

Figure 1 is a side elevation of a conventional form of frying pan and illustrating the application of a device embodying my invention, Fig. 2, is a top plan view of the device shown in Fig. 1 with the cover removed, Fig. 3, is a sectional view taken on line 3—3 of Fig. 1, and Fig. 4, is a detail view of a slightly modified form of the cover for the utensil.

Referring now more particularly to the drawings, 5 indicates a frying pan or skillet, the same being formed at its upper edge with an outwardly projecting flange 6, the latter being turned upwardly at its outer extremity as at 7. This pan is equipped with the usual pouring spout or lip 8, and a handle 9 projects from the body of the pan to enable the same to be conveniently handled. For use in connection with this skillet or pan is a wall member 10. This wall member may be in the shape of a cylinder of a size and contour to enable the same to rest at its lower edges upon the flange 6 of the pan and within the outwardly projecting upturned portion 7 of the said flange. This wall also may be of any desired depth, a handle 11 being arranged upon the outer surface of the wall to permit of carrying or adjusting the same. The wall thus provided forms an extension of the rim of the pan 5, and an outwardly projecting portion 12 is arranged upon the pan to extend over and into the spout 8 and to engage with the inner edges of the latter. This arrangement assists in preventing the wall from becoming detached from the pan when the same is being carried about or moved upon the stove.

The upper edge of the wall 10 may be turned outwardly and upwardly as shown at 13, the said portion providing a seat for the annular edges of a cover 14. This cover may be equipped with a lifting knob 15, and is preferably provided with relatively close perforations throughout its area to permit of the escape of steam from the interior of the pan during the cooking operation.

From this construction it is apparent that the extension wall 10 may be quickly and easily adjusted to the pan, and when so adjusted is held by the upturned portion 7 and the projection 12 within the spout 8 from becoming detached from the cooking vessel. In frying food within the pan so arranged it is obvious that grease will be prevented from splashing from the pan onto the hands of the cook, upon the stove or floor. By the arrangement of the extension wall for the pan it is obvious that the same may be efficiently employed as a roasting or baking receptacle.

In Fig. 4 of the drawing, I have shown a slightly modified form of cover for the device, in which a tubular outlet 16 is arranged centrally of the cover to permit of the escape of steam from the vessel. In this form of the device the perforations in the pan cover may be reduced in number or done away with entirely. A finger grip 17 is secured upon the modified form of cover to permit of ready handling of the same.

While I have herein shown and described a particular or preferred embodiment of the invention, I wish it to be understood that I need not confine myself to all the precise details of construction herein set forth by way of illustration as modification and variation may be made without departing from the spirit of the invention or exceeding the scope of the appended claim.

What is claimed is:

A cooking utensil, comprising in combination, a pan structure having a pouring lip and a vertical marginal flange forming an internal seat, a wall member formed to rest on said internal seat, a projection on the wall member shaped to fit into said pouring spout to lock the pan and wall member against relative movement, and a removable cover for the wall member, said projection also serving as a closure for the pouring spout.

In testimony whereof, I affix my signature, in the presence of two witnesses.

ANNA P. WILLIAMS.

Witnesses:
 GEORGE B. CARSON,
 ELIZABETH M. THOMAS.

Copies of this patent may be obtained for five cents each, by addressing the "Commissioner of Patents. Washington, D. C."